May 11, 1937.   F. LANG   2,080,139
AIR CHAMBER DIESEL ENGINE
Filed Oct. 28, 1935
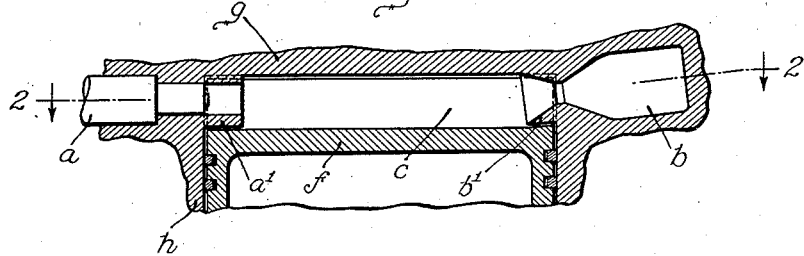
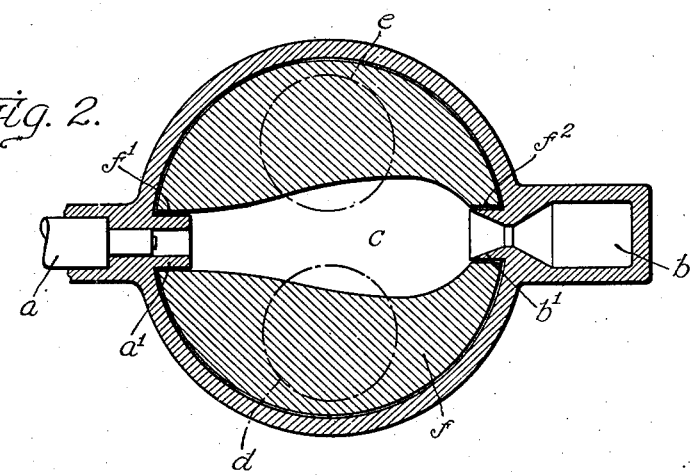
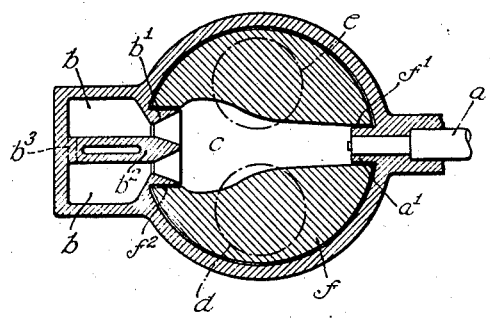
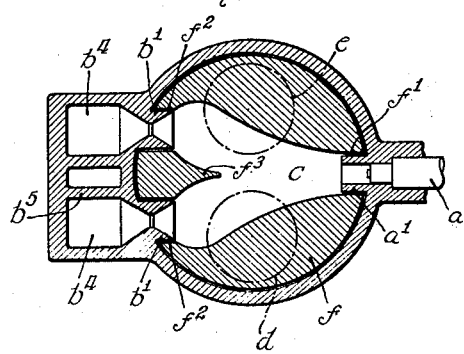
Inventor:
Franz Lang
By: Brown, Jackson, Boettcher & Dienner,
Attys.

Patented May 11, 1937

2,080,139

UNITED STATES PATENT OFFICE 2,080,139

AIR CHAMBER DIESEL ENGINE

Franz Lang, Munich, Germany, assignor to Lanova Aktiengesellschaft, Vaduz, Liechtenstein Application October 28, 1935, Serial No. 46,990
In Germany November 8, 1934

3 Claims. (Cl. 123—32)

This invention relates to injection engines.

It is known, in air chamber Diesel engines, to provide a combustion chamber in the piston head, or partly in the piston head and partly in the cylinder head, this chamber being of less diameter than the piston head and communicating with the injection nozzle and the air chamber by way of channel-like recesses in the piston head.

The present invention has to do with an air chamber Diesel engine in which port members, associated with the air chamber and the injection nozzle, extend into recesses in the piston, are opposed, and are relatively inclined and related to the combustion chamber in such manner that the air stream, discharged from the air chamber, is directed against the combustion chamber wall remote from and below the injection nozzle port. The combustion chamber extends across the piston head and is so shaped, in plan, that it diminishes in width from the air chamber port member to the injection nozzle port member. By this arrangement contact of the injected fuel with the circumferential surface of the piston is prevented and the air ejected from the air storage chamber is directed to the injection nozzle with minimum turbulence laterally of the combustion chamber, prior to entering the cylinder displacement space. The air is thus forced to penetrate the full diameter of the cylinder and the charge is distributed more uniformly from the center toward the sides of the cylinder, which is conducive to better combustion.

The air storage chamber port member may be provided with a central partition wall, forming two separate air ports. This wall may be extended into the air chamber, separating it into two compartments, which may be in communication through an opening in the wall. If two parallel adjacent air chambers are provided, they may have a common port member divided into two ports, or may have separate port members, the piston being provided with a corresponding groove or grooves. The element between the ports, or between the grooves in the piston, as the case may be, is preferably formed to provide a tapering point or tongue at or adjacent the air chamber ports effective to split the injected fuel stream and direct the fuel toward the air chamber ports, this tongue also serving to guide the air streams ejected from the air chambers in such manner as to promote their union.

The above features of my invention are particularly suitable for high speed engines of small or medium power output. While my invention is directed particularly to air storage chamber Diesel engines it is not limited to this one type since, in certain aspects, it may be adapted to pre-chamber and other types of Diesel engines.

In the drawing:—

Figure 1 is a fragmentary axial sectional view through the end portion of the cylinder of an injection engine embodying my invention, showing the elements with which my invention is concerned, certain parts being shown in elevation;

Figure 2 is a sectional view taken substantially on line 2—2 of Figure 1, the injection nozzle being shown in plan and the inlet and exhaust valves being indicated;

Figure 3 is a view similar to Figure 2, on a reduced scale, illustrating a modified form of engine embodying my invention; and Figure 4 is a view similar to Figure 3 but illustrating a second modified form of engine embodying my invention.

Referring to Figures 1 and 2, the engine comprises injection nozzle $a$, air storage chamber $b$, combustion chamber $c$, formed as a depression in the head of piston $f$ operating in cylinder $h$, and overhead inlet and exhaust valves indicated at $d$ and $e$, respectively, in Figure 2, mounted in cylinder head $g$. Combustion chamber $c$ extends diametrically of the piston head, is of vase shape in plan, and flares in width away from groove $f^1$ in the piston head, opening into one end of chamber $c$, to within a short distance of a second groove $f^2$ in the piston head and opening into the other end of chamber $c$, and thence diminishes in width to the latter groove. Groove $f^1$ is disposed to receive, in the raised position of piston $f$ shown in Figure 1, a port member $a^1$ formed integrally with cylinder head $g$ and defining a port concentric with and extending inwardly from the tip of injection nozzle $a$. Groove $f^2$ receives a port member $b^1$ formed integrally with cylinder head $g$ and defining a funnel-shaped port leading to a restricted orifice opening into air storage chamber $b$. The latter is conveniently formed integrally with cylinder head $g$ and is inclined downward and inward of the cylinder, as shown in Figure 1, so that an air stream ejected from chamber $b$ into combustion chamber $c$ will impinge upon the lower surface of the latter below and remote from port element $a^1$. If desired, the combustion chamber $c$ may be formed in the cylinder head $g$, or partly therein and partly in the piston head. These are possible variations which will be understood readily, and need not be illustrated, nor described in greater detail.

In the modified form shown in Figure 3, air storage chamber $b$ is separated into two compartments by a partition $b^2$ having an opening $b^3$ establishing communication between the compartments. This assures that the pressure in the two compartments is at all times equalized. Partition $b^2$ extends into port member $b^1$ and is there tapered in width toward chamber $c$. Member $b^1$ is thus divided into two funnel-shaped ports separated by a tapered element in the nature of a tongue, the point of which is aligned with the central opening of nozzle $a$. This tongue serves to split the injected fuel stream and to direct the fuel into the compartments of air storage chamber $b$, during the first part of the injection period. Channel $f^2$ of piston $f$ is of proper size and shape to receive port member $b^1$, and combustion chamber $c$ is appropriately formed. Otherwise, the construction and operation of the engine of Figure 3 are the same as in Figures 1 and 2.

In the embodiment of Figure 4, two non-communicating air storage chambers $b^4$ are separated by a suitable partition $b^5$. The port members $b^1$ of chambers $b^4$ are spaced apart and piston $f$ is provided with two grooves $f^2$ correspondingly spaced apart. The portion of the piston between grooves $f^2$ is provided with a tongue element $f^3$ of considerable length tapering toward nozzle $a$ with its apex aligned with the nozzle opening. Combustion chamber $c$ is appropriately formed, and tongue $f^3$ serves to split the injected fuel stream and to direct the fuel into the respective chambers $b^4$, during the early part of the injection period, while also facilitating union of the streams of fluid ejected from chambers $b^4$ after ignition of the fuel mixture charge and during the combustion stroke. Except for the above noted distinctions, the engine of Figure 4 is similar to that of Figures 1 and 2.

In Figures 3 and 4 the air storage chambers are preferably inclined as in Fig. 1, so that the fluid streams ejected from these chambers are directed downward in such manner that the injection nozzle port member is not subjected, to an objectionable extent, to the hot blast from the air storage chamber.

What I claim is:—

1. In an injection engine, a cylinder and a piston operating therein, the head of said piston having a depression defining a combustion chamber disposed diametrically of the piston, said piston having grooves opening into the ends of said chamber and the latter increasing in width from the groove at one end thereof to within a short distance of its other end and thence decreasing in width to the groove at said other end, an air storage chamber structure at one side of said cylinder comprising a port member disposed to fit into the groove at said other end of the combustion chamber and defining two ports and funnel-shaped passages leading to said ports and flaring inward of said combustion chamber with an element therebetween tapering inward of said combustion chamber, the lateral walls of said combustion chamber merging into the lateral walls of said passages and forming continuations thereof, in the position of maximum compression of said piston, a port member at the opposite side of said cylinder disposed to fit into the groove at said one end of the combustion chamber as the piston approaches its position of maximum compression, and an injection nozzle disposed to inject fuel through said second port member into said chamber lengthwise thereof and toward said element, the apex of the latter being aligned with the injection opening of said nozzle.

2. In an injection engine, a cylinder and a piston operating therein, the head of said piston having a depression defining a combustion chamber disposed diametrically of the piston, said piston having a groove opening into one end of said chamber and the latter increasing in width to within a short distance of its other end and thence decreasing in width to said other end, a port member at one side of the cylinder disposed to fit into said groove as the piston approaches its position of maximum compression, an air storage chamber structure at the opposite side of said cylinder comprising means defining, in the position of maximum compression of said piston, two ports leading into said structure through funnel-shaped passages flaring inward of said combustion chamber with a tapered element therebetween, the lateral walls of said combustion chamber merging into the lateral walls of said passages and forming continuations thereof, in the position of maximum compression of the piston, and an injection nozzle disposed to inject fuel through said port member into said chamber lengthwise thereof and toward said element, the apex of the latter being disposed to split the injected fuel stream.

3. In an injection engine, a cylinder and a piston operating therein, the head of said piston having a depression defining a combustion chamber disposed diametrically of the piston, said piston having a groove opening into one end of said chamber and two spaced grooves opening into the other end of said chamber, said combustion chamber increasing in width from said one end to within a short distance of said other end thereof and thence decreasing in width to the grooves at said other end, a port member at one side of said cylinder disposed to fit into said groove as the piston approaches its position of maximum compression, an air storage chamber structure at the opposite side of said cylinder comprising two port members spaced apart and disposed to fit into said two spaced grooves as the piston approaches its position of maximum compression, each of said two port members defining a funnel shaped passage flaring inward of said combustion chamber, said piston having a portion disposed to fit between said two port members and comprising a tapered tongue, the lateral walls of said combustion chamber merging into the lateral walls of said passages and forming continuations thereof, in the position of maximum compression of the piston, and an injection nozzle disposed to inject fuel through said port member at said one side of said cylinder into said chamber lengthwise thereof toward said tongue, the latter being disposed to split the injected fuel stream and direct the fuel into said air storage chamber structure through said passages.

FRANZ LANG.